US009541440B2

United States Patent
Larson et al.

(10) Patent No.: US 9,541,440 B2
(45) Date of Patent: Jan. 10, 2017

(54) DOSING CUP FOR A DETERGENT COMPOSITION

(71) Applicant: The Procter & Gamble Company, Cincinnati, OH (US)

(72) Inventors: Signe Christina Larson, Cincinnati, OH (US); Robb Eric Olsen, Cincinnati, OH (US); Paul Frank Diehl, Brooklyn, NY (US)

(73) Assignee: The Procter & Gamble Company, Cincinnati, OH (US)

( * ) Notice: Subject to any disclaimer, the term of this patent is extended or adjusted under 35 U.S.C. 154(b) by 125 days.

(21) Appl. No.: 14/519,161

(22) Filed: Oct. 21, 2014

(65) Prior Publication Data

US 2016/0109276 A1 Apr. 21, 2016

(51) Int. Cl.
| | | |
|---|---|---|
| *A46B 11/00* | (2006.01) | |
| *G01F 19/00* | (2006.01) | |
| *B65D 41/26* | (2006.01) | |
| *B65D 47/06* | (2006.01) | |
| *D06F 3/04* | (2006.01) | |
| *D06F 39/02* | (2006.01) | |

(52) U.S. Cl.
CPC .............. *G01F 19/00* (2013.01); *B65D 41/26* (2013.01); *B65D 47/06* (2013.01); *D06F 3/04* (2013.01); *D06F 39/024* (2013.01); *G01F 19/002* (2013.01)

(58) Field of Classification Search
CPC ................................. D06F 39/024; D06F 3/04
USPC ................................................. 401/126, 123
See application file for complete search history.

(56) References Cited

U.S. PATENT DOCUMENTS

| | | | |
|---|---|---|---|
| D440,501 S | 4/2001 | Dorion | |
| 6,375,031 B1 | 4/2002 | Kwan | |
| 8,870,485 B2 * | 10/2014 | Davis | D06F 39/024 401/123 |
| 9,003,879 B1 | 4/2015 | Honan et al. | |

(Continued)

FOREIGN PATENT DOCUMENTS

| | | |
|---|---|---|
| EP | 1 813 708 A2 | 8/2007 |
| EP | 2 789 722 A1 | 10/2014 |

OTHER PUBLICATIONS

International Search Report for International Application Serial No. PCT/US2015/056420, mailed Feb. 19, 2016, 11 pages.

(Continued)

*Primary Examiner* — Jennifer C Chiang
(74) *Attorney, Agent, or Firm* — Abbey A. Lopez; Lauren Christine Gonzalez; Gary J. Foose

(57) ABSTRACT

A dosing cup having a longitudinal axis includes a base; an opening opposing the base, wherein the opening is circumscribed by a rim; and a sidewall extending from the base to the rim. The sidewall includes a first portion extending from the rim toward the base. The first portion has a projection with a dosing indicium. The projection is defined by a length extending axially along the sidewall and a width that is perpendicular to the length. The width of the projection is less than the length of the projection. The sidewall includes a second portion extending from the base toward the rim. The second portion has a recess. The projection of the first portion mates with the recess of the second portion. The first portion has a first translucency and the second portion has a second translucency, wherein the first translucency is different than the second translucency.

19 Claims, 12 Drawing Sheets

(56) References Cited

U.S. PATENT DOCUMENTS

| | | | | |
|---|---|---|---|---|
| 2006/0091153 A1* | 5/2006 | Evans | ................... | G01F 11/26 |
| | | | | 222/1 |
| 2009/0158844 A1 | 6/2009 | DiPietro et al. | | |
| 2012/0297552 A1 | 11/2012 | Davis et al. | | |
| 2012/0324653 A1 | 12/2012 | Chawla et al. | | |
| 2014/0034924 A1 | 2/2014 | Kawata et al. | | |
| 2014/0182067 A1* | 7/2014 | Di Bono | ................. | D06F 39/02 |
| | | | | 8/137 |
| 2014/0304924 A1* | 10/2014 | Van Den Bergh | ........ | D06F 3/00 |
| | | | | 8/137 |

OTHER PUBLICATIONS https://www.webpackaging.com/en/portals/stiplastics/assets/
?pb=11039380—Video on Stiplastics, Innovative Pharmaceutical Packaging website entitled "In-Mold Labelling on Dosing Cups and Spoons", Mar. 11, 2011, 2:15 minutes.

* cited by examiner

DOSING CUP FOR A DETERGENT COMPOSITION

FIELD

The present disclosure is directed to dosing cups, and, more particularly, to dosing cups for detergent compositions.

BACKGROUND

Detergent compositions, such as laundry or dish detergents, and including liquids, gels, and powders, are dosed into washing machines based upon the size of the load or the degree of soil on the items to be washed. Consumers often rely on dosing indicia in the interior of a lid or dosing cup to measure the proper amount of detergent composition for a given wash cycle. However, the dosing indicia on the interior of the dosing cup or lid is often difficult to see. Moreover, the consumer may be rushed or may not be particularly careful in measuring the proper dose of detergent composition. As a result, the user may not dose enough detergent composition into a wash cycle, or the user may add more detergent composition than is needed for a particular wash cycle. Consequently, the items to be washed may be insufficiently cleaned or the detergent composition may be consumed at a faster rate than necessary. Therefore, it would be beneficial to provide a dosing cup that allows a user to quickly and easily measure the proper dose of detergent composition.

Dosing cups having windows to view the liquid from the interior or exterior of the cup do exist. However, such windows may be formed of a separate material from the remaining dose cup, and, thus, may leak at the seams of the window. In addition, some dosing windows are so large in size relative to the size of the dosing cup as a whole and also relative to any dosing indicium on the dosing cup that it takes time for a user to focus in on the dosing indicium while measuring a dose of detergent.

Different ways to fill and measure detergent compositions into dosing cups exist. For example, some consumers may hold the dosing cup with one hand and pour the detergent composition from a container held in the opposite hand. Other users may hold the dosing cup in one hand and dispense a detergent composition from a dispensing system that is stationary on a rigid surface, such as a countertop. In these different situations, consumers may measure the desired dose of detergent composition in different ways depending upon which method the user intuitively finds more appropriate in the given situation. For example, some consumers may measure the detergent composition by viewing the interior of the dosing cup, while other consumers may measure the detergent composition by viewing the exterior of the dosing cup. Therefore, it would be beneficial to provide a dosing cup that allows a user to measure a dose of detergent composition from the interior and exterior of the dosing cup.

In addition, some consumers may use the dosing cup to pretreat soiled items, such as clothes. Therefore, it would be beneficial to provide spreading or scrubbing elements to assist the user in pretreating soiled clothing. It may also be beneficial to provide a dosing cup that is ergonomically configured to perform multiple functions.

SUMMARY

One aspect of the present disclosure includes a dosing cup having a longitudinal axis and defining an interior and an exterior. The dosing cup comprises a base and an opening opposing the base. The opening is circumscribed by a rim. The dosing cup comprises a sidewall extending from the base to the rim. The sidewall comprises a first portion extending from the rim toward the base. The first portion comprises a projection. The projection is defined by a length that extends axially along the sidewall and a width that is perpendicular to the length. The width of the projection is less than the length of the projection. The projection comprises a dosing indicium. The sidewall comprises a second portion extending from the base toward the rim. The second portion comprises a recess. The projection of the first portion at least partially mates with the recess of the second portion. The first portion has a first translucency and the second portion has a second translucency. The first translucency is different than the second translucency.

Aspects of the present disclosure also include a dosing cup having a longitudinal axis. The dosing cup comprises a base and an opening opposing the base. The opening is circumscribed by a rim. The dosing cup comprises a sidewall extending from the base to the rim. The sidewall comprises a first portion extending from the rim toward the base. The first portion has a first translucency. The sidewall comprises a second portion extending from the base toward the rim. The second portion has a second translucency that is different from the first translucency. The first and second portions are contiguous. The first portion comprises a first dosing indicium and the second portion comprises a second dosing indicium, wherein the first dosing indicium is circumferentially adjacent and axially aligned with the second dosing indicium.

Aspects of the present disclosure include a dosing cup having a longitudinal axis and defining an interior and an exterior. The dosing cup comprises a base and an opening opposing the base. The opening is circumscribed by a rim. The dosing cup comprises a sidewall extending from the base to the rim. The sidewall comprises a first portion extending from the rim to the base. The first portion has a first translucency. The first portion comprises a projection having a dosing indicium. The sidewall comprises a second portion extending from the base toward the rim. The second portion has a second translucency. The second portion comprises a recess having a dosing indicium. The projection of the first portion mates with the recess of the second portion and the dosing indicium of the projection is axially aligned with the dosing indicium of the recess. The first translucency is different than the second translucency. The second portion partially overlaps the first portion, wherein the second portion does not overlap the first portion at the projection.

DETAILED DESCRIPTION

Figure 1:
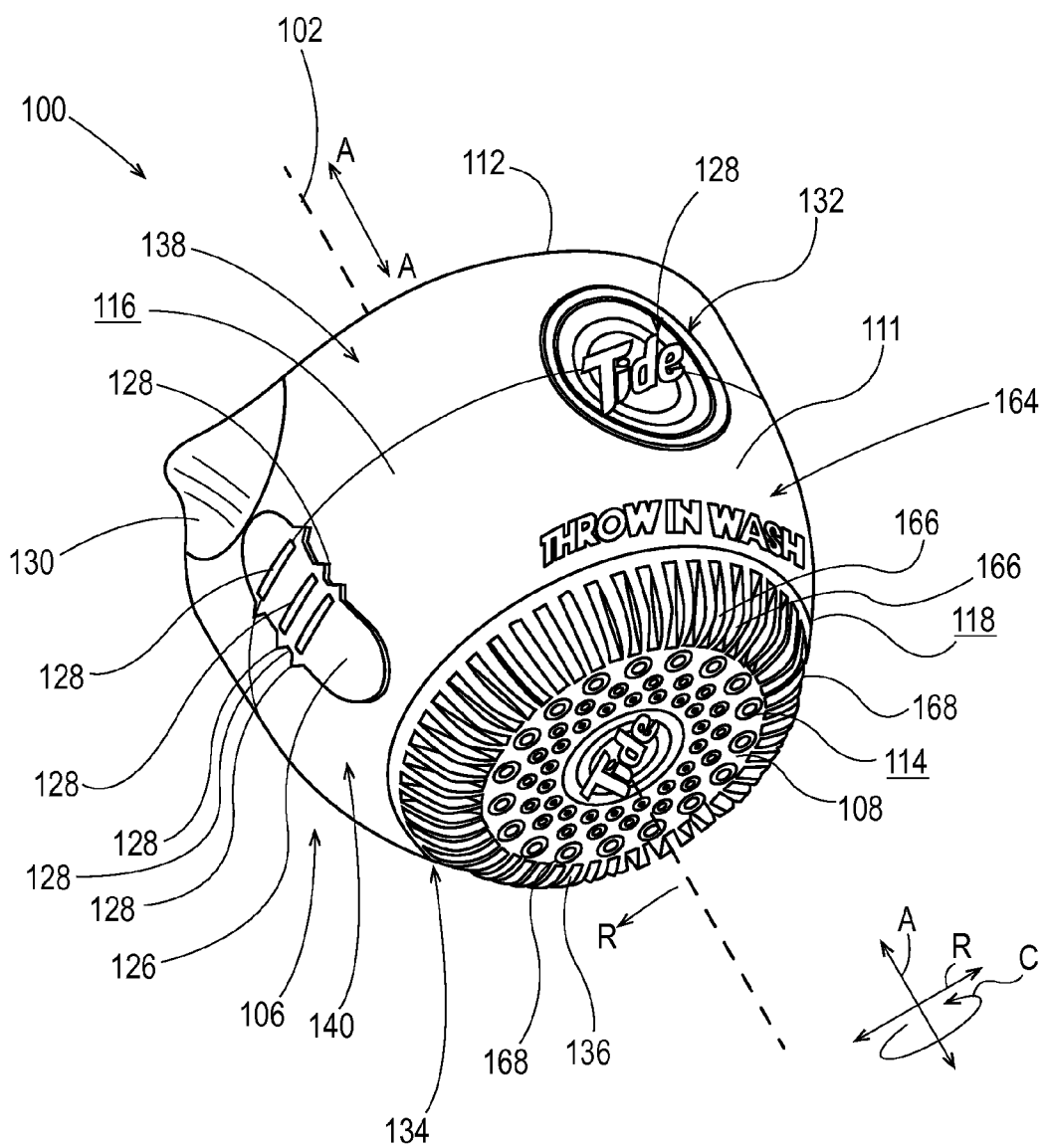
FIG. 1 is a bottom, perspective view of a dosing cup.

The following definitions may be useful in understanding the present disclosure. The length along the major axis of an element of the dosing cup, for instance a scrubbing protrusion, is the length of the element in the longest direction of the element, as measured along the mid-point of the element. The width of the element, at a specified point along the major axis of an element, is the width as measured perpendicular to the major axis at the specified point along the major axis of the element. Where the position along the major axis is not defined, the width is deemed to be the maximum width, as measured perpendicular to the major axis, over the entire element. The height of an element is measured perpendicular to the surface to which the element is attached, at the specified point along the major axis of the element. Where the position along the major axis is not defined, the height is deemed to be the maximum height as measured perpendicular to the surface, over the entire element.

The present disclosure includes a dosing cup. The dosing cup can be used to measure a desired dose of detergent composition, dose the detergent composition into an automatic washing machine, and/or pre-treat soiled items to be washed in the washing machine. The dosing cup may be used for various detergent compositions, including liquids, gels, and loose powders. The detergent composition may include a laundry detergent or a dish-washing detergent. The automatic washing machine may include an automatic laundry-washing machine or an automatic dish-washing machine.

The dosing cup has a longitudinal axis. The dosing cup comprises a base and an opening opposite the base. The opening is circumscribed by a rim. The dosing cup comprises a sidewall that extends from the base to the rim. The sidewall includes a first portion extending from the rim toward the base and a second portion extending from the base toward the rim. The first portion has a first translucency and the second portion has a second translucency that is different from the first translucency. The first and second portions may be contiguous.

The first portion may comprise a dosing window. The dosing window may be configured as a projection. The projection is defined by a length that extends axially along the sidewall and a width that is perpendicular to the length. The width of the projection is less than the length of the projection. The second portion comprises a recess. At least a portion of the projection is configured to mate with the recess of the second portion. The dosing window may also comprise a dosing indicium.

The first portion may comprise a first dosing indicium and the second portion may comprise a second dosing indicium. The first dosing indicium may be circumferentially adjacent to and axially aligned with the second dosing indicium.

The first portion and the second portion may be configured as separate layers of material. In some exemplary configurations, the first portion of the dosing cup may overlap with the second portion of the dosing cup.

Dosing Cup

Figure 2:
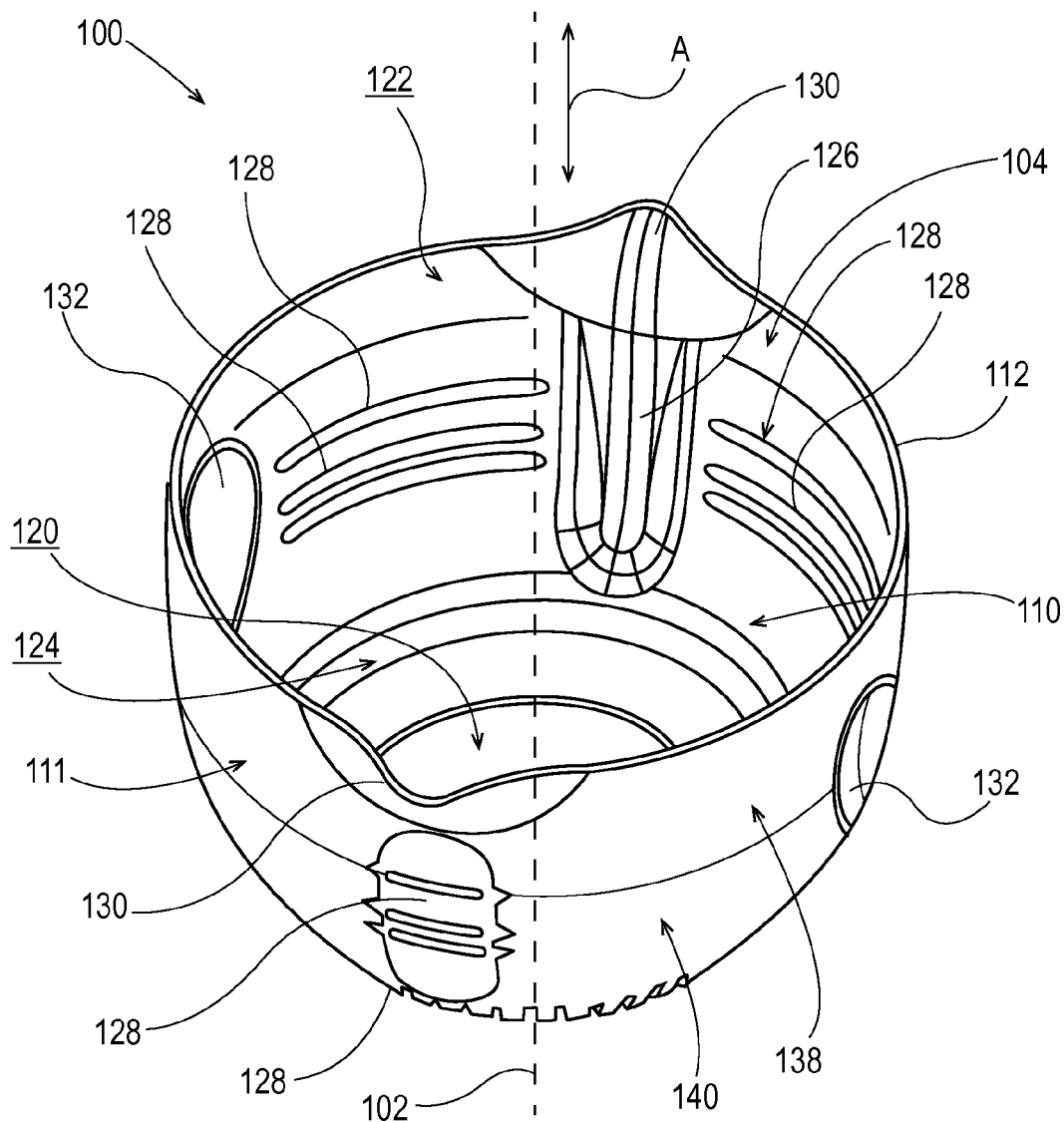
FIG. 2 is a top, perspective of a dosing cup.

With reference to FIGS. 1 and 2, the dosing cup 100 has a longitudinal axis 102 and defines an interior 104 and exterior 106. The dosing cup 100 comprises a base 108 and an opening 110 opposite the base 108. The opening 110 is circumscribed by a rim 112. The dosing cup 100 comprises a sidewall 111 that extends from the base 108 to the rim 112. The exterior 106 of the dosing cup 100 includes an exterior base surface 114 connected to an exterior wall surface 116 at an exterior periphery surface 118. The interior 104 of the dosing cup 100 includes an interior base surface 120 and an interior wall surface 122 at least partially connected together at an interior periphery surface 124. The dosing cup 100 also comprises a dosing window 126 and one or more dosing indicium 128. The dosing cup 100 may comprise one or more spouts 130, gripping regions 132, scrubbing regions 134, spreading regions 136, or combinations thereof, such as shown in FIGS. 1 and 2.

The sidewall 111 of the dosing cup 100 may include multiple portions. As shown in FIGS. 1-3B, the sidewall 111 may include a first portion 138 that extends axially from the rim 112 of the dosing cup 100 toward the base 108. The dosing cup 100 may also include a second portion 140 that extends axially from the base 108 of the dosing cup 100 toward the rim 112.

Figure 3A:
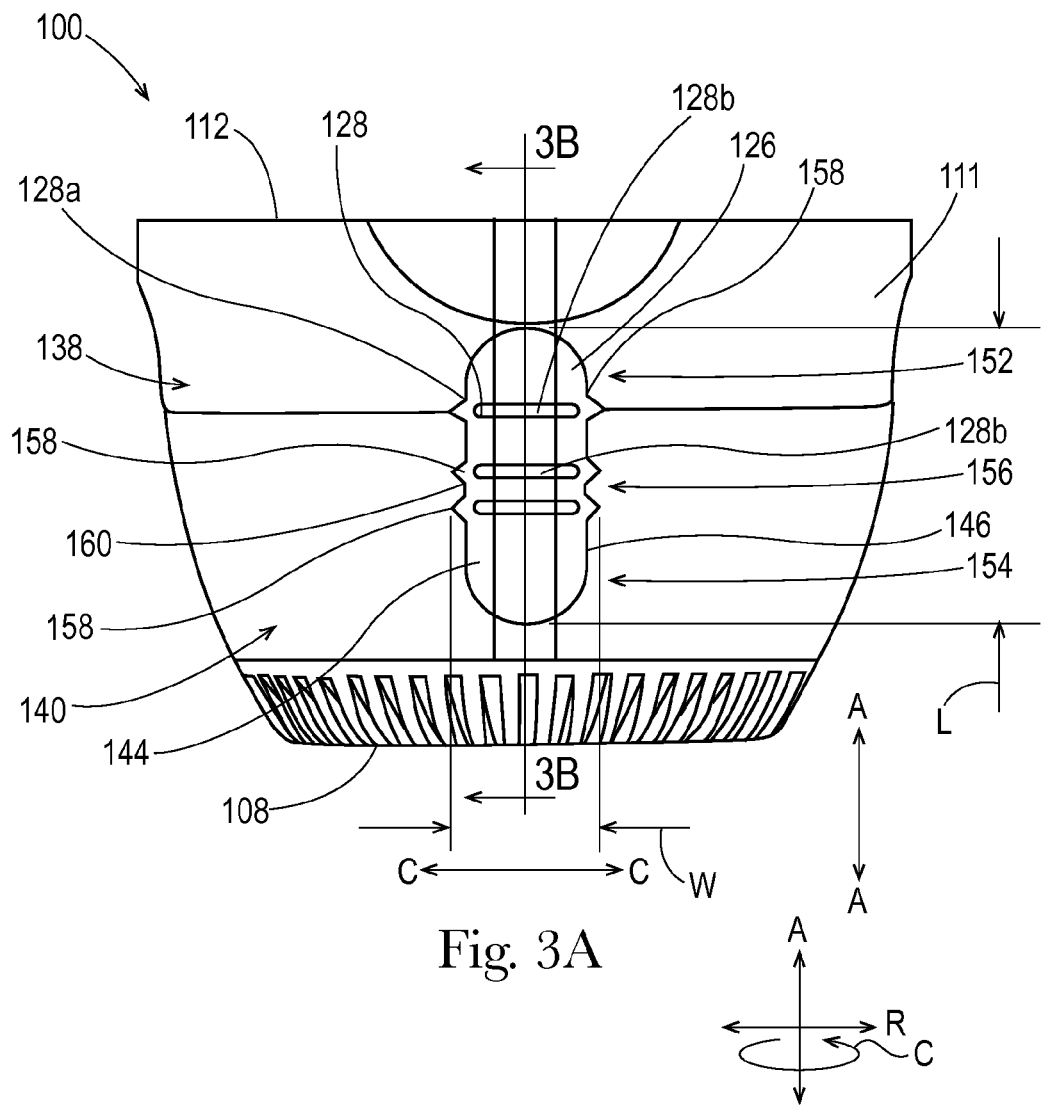
FIG. 3A is a front, elevation view of a dosing cup having a dosing window.

As shown in FIG. 3A, the first portion 138 of the sidewall 111 may comprise a dosing window 126. The dosing window 126 may include a projection 144 that extends axially along the sidewall. In such an exemplary configuration, the second portion may comprise a recess 146. At least a portion of the projection 144 mates with the recess 146 of the second portion 140. It is to be appreciated that the terms "mate", "mates", and "mating" as used herein refer to one element fitting together with another element. With reference to FIGS. 1-3A, the recess 146 in the second portion 140 allows the dosing window 126 to be visible from the interior 104 and/or exterior 106 of the dosing cup 100.

Figure 3B:
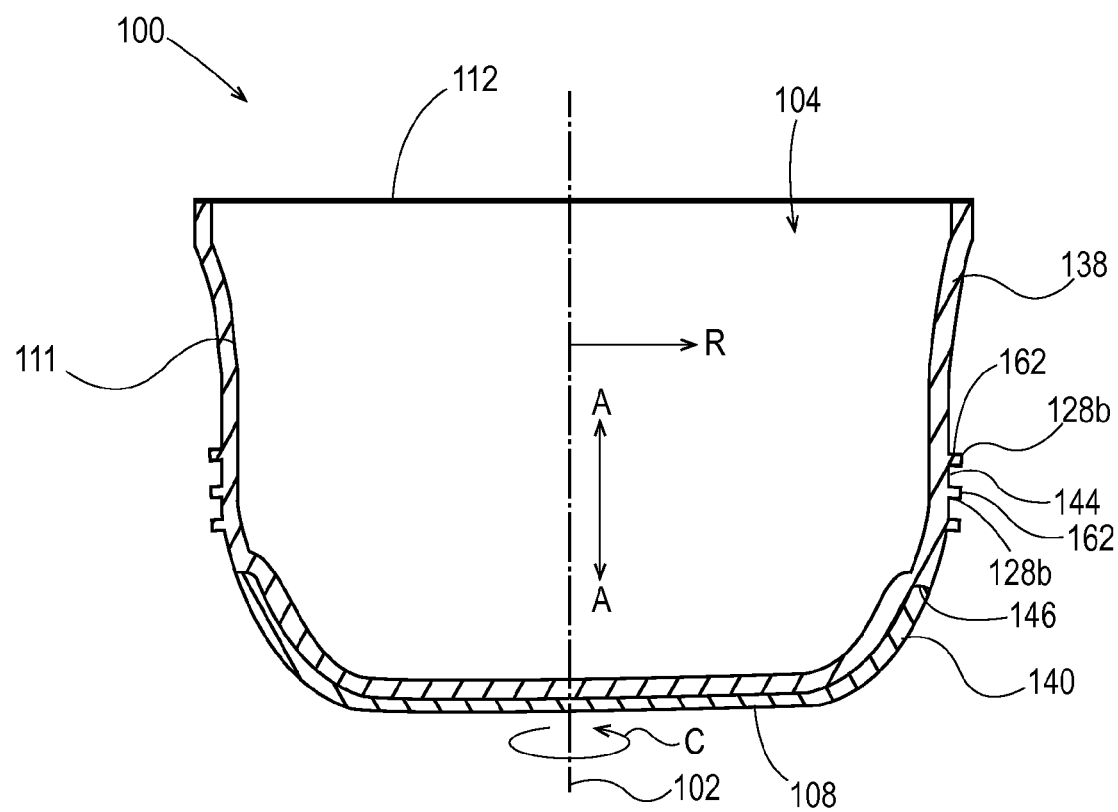
FIG. 3B is a sectional view of an exemplary configuration of the dosing cup of FIG. 3A taken along lines 3-3.
Figure 4:
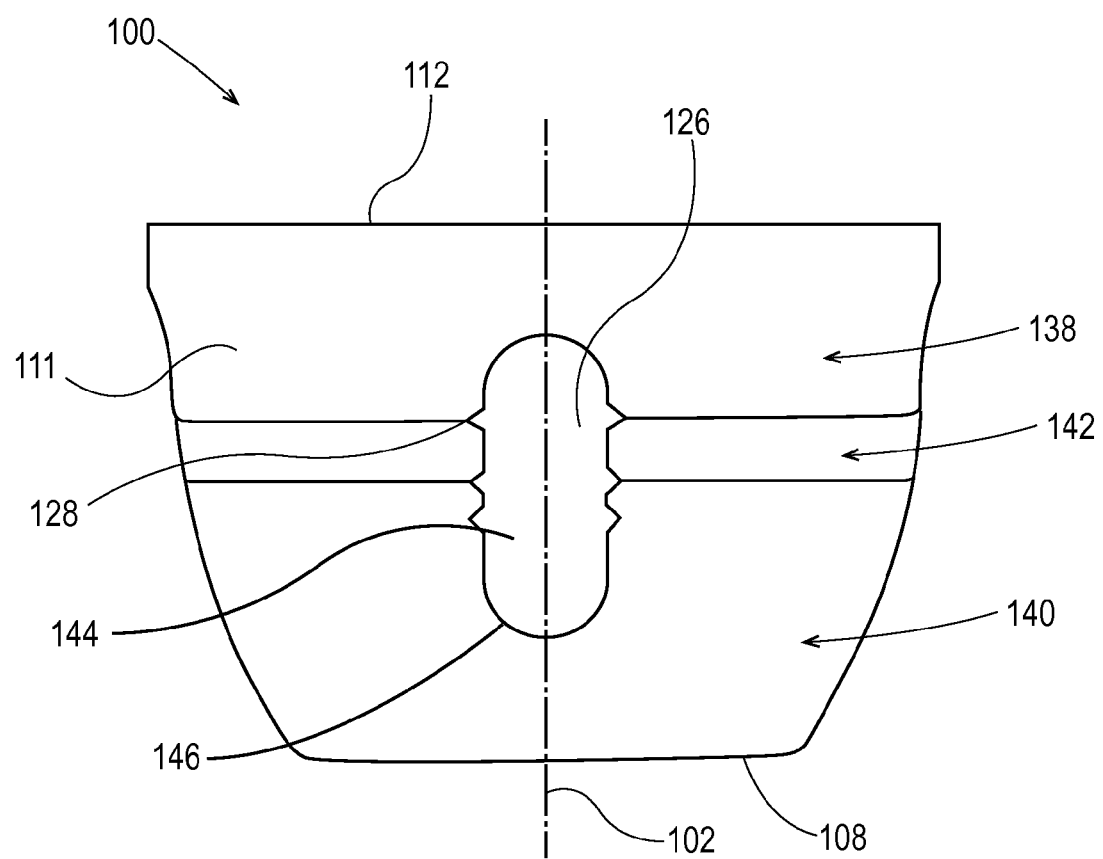
FIG. 4 is a front, elevation view of a sidewall of a dosing cup having first, second, and third portions.

In an exemplary configuration such as shown in FIGS. 3A and 3B, the first and second portions 138 and 148 may be contiguous along the exterior wall surface 116. However, it is to be appreciated that in other exemplary configurations, such as shown in FIG. 4, the sidewall 111 may include additional portions in the exterior wall surface 116, such as a third portion 142, positioned between the first and second portions 138 and 140. As such, the projection 144 of the first portion 138 may mate with the third portion 142 and the second portion 140.

In order to quickly draw the user's attention to the dosing window, the first portion 138 may be differentiated from the second portion 140 and any other portions in at least one of color, translucency, material, texture, and/or combinations thereof. In an exemplary configuration, the first portion 138 may have a first translucency and the second portion 140 may have a second translucency that is different from the first translucency. For example, the first portion 138 may be transparent and the second portion 140 may be opaque. A material is defined as "opaque" when the material has a measured translucency of less than 30% (using the method enclosed herein for measuring translucency). A material is defined as "transparent" when the material has a measured translucency of greater than 50%, using the method described herein. In some exemplary configurations, the first translucency of the first portion 138 may be at least 10% different from the second translucency of the second portion 140, or at least 15%, at least 25%, or at least 30% different from the second translucency.

It is to be appreciated that having the first portion 138 be a different translucency than the second portion 140 may help the user more quickly and accurately make a dosing measurement.

The first portion 138 may be a different color than the second portion 140. In some exemplary configurations, the first portion 138 may be a color other than white, such as orange, and the second portion may be white 140.

In some exemplary configurations, such as shown in FIG. 3B, the first portion 138 and the second portion 140 may be configured as separate layers of material. In such an exemplary configuration, the first portion 138 may at least partially overlap the second portion 140. In an exemplary configuration comprising a dosing window 126, the first portion 138 may not overlap the second portion 140 at the dosing window. In such an exemplary configuration, such as shown in FIG. 3B, the first portion 138 and the second portion 140 may each be integral with the base 108 such that the base 108 is comprised of at least two layers of material. It is to be appreciated that having at least the first portion 138 integral with the base 108 provides a dosing cup 100 that is a liquid-tight structure so that detergent cannot leak, such as at the dosing window, for example.

Figure 3C:
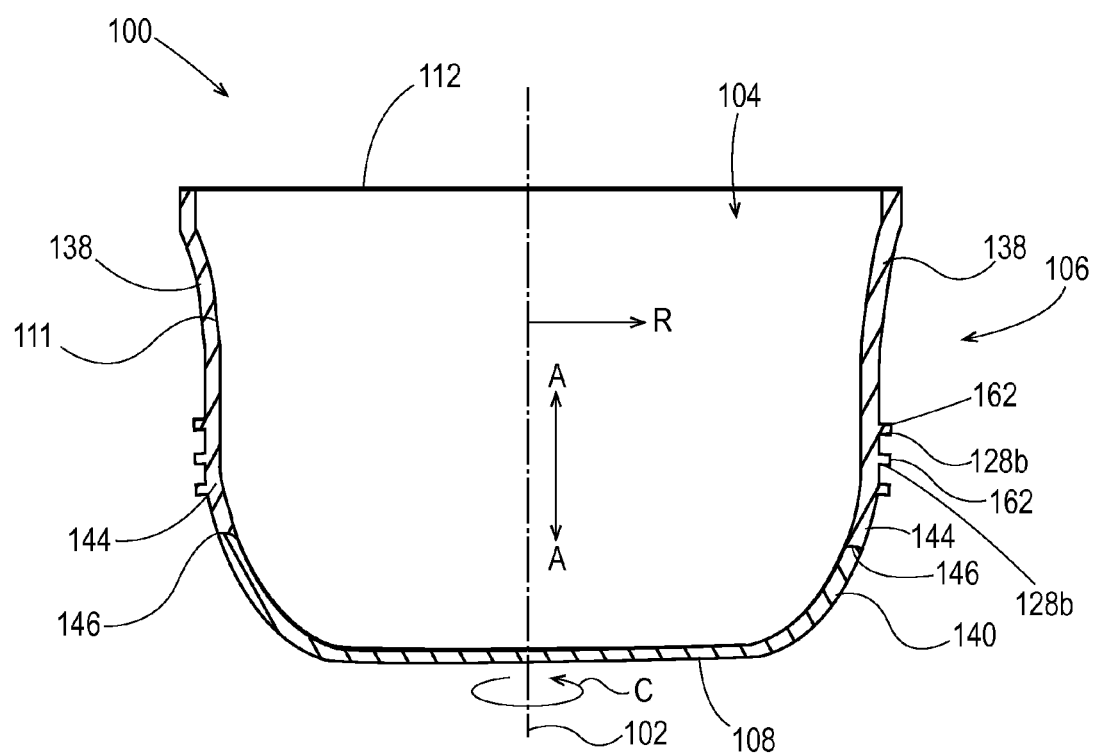
FIG. 3C is a sectional view of another exemplary configuration of the dosing cup of FIG. 3A taken along line 3-3.

However, in other exemplary configurations, such as shown in FIG. 3C, the first portion 138 may not extend all the way to the base 108, and, thus, may not form a portion of the base 108. In such an exemplary configuration, the second portion 140 may form at least a portion of the base 108.

With reference to FIGS. 3A-3C, the dosing cup 100 may be made of a variety of rigid or semi-rigid polymeric materials such as high density polyethylene or polypropylene. It is to be appreciated that the dosing cup may comprise any other material or materials having sufficient structural integrity to be used as a dosing cup 100 for dosing a detergent composition into an automatic washing machine, and/or as a pre-treatment cup for spreading and/or scrubbing a detergent composition onto a soiled surface. In addition, the material may have sufficient structural integrity such that the dosing cup 100 is able to be placed in the washing machine and ran through a cleaning cycle. The first portion 138 and the second portion 140 may comprise the same materials, or each may comprise different materials.

With reference to FIG. 1, the exterior base surface 114 can provide a surface arrangement that can be stably set upon a substantially flat surface, such as a table or a flat portion of a washing machine or dryer. With such a configuration, when detergent composition is poured into the dosing cup 100, the dosing cup 100 will not easily tip over.

The dosing cup 100 can be configured in various shapes. For example, when viewed from above, such as shown in FIG. 2, the rim 112 may have a substantially circular shape. In other exemplary configurations, the rim 112 may have an arcuate, oval, square, diamond, or rectangular shape.

The dosing cup 100 can be any suitable size. For stability, the base 108 may have an area of from 300 mm$^2$ to 8,000 mm$^2$, or from 900 mm$^2$ to 5,600 mm$^2$, or from 1,900 mm$^2$ to 3,800 mm$^2$. The width of the base 108 will typically range from 20 mm to 100 mm, or 35 mm to 85 mm, or from 50 mm to 70 mm. For easy filling, the opening 110 will typically have an area of from 700 mm$^2$ to 9,500 mm$^2$, or from 1,500 mm$^2$ to 7,000 mm$^2$, or from 2,500 mm$^2$ to 5,000 mm$^2$. The width of the opening 110 will typically range from 30 mm to 110 mm, or 45 mm to 95 mm, or from 60 mm to 80 mm. The sidewall 111 will typically have a height of from 20 mm to 85 mm, or from 35 mm to 70 mm.

As shown in FIG. 1, the exterior base surface 114 can be connected to the exterior wall surface 116 at the exterior periphery surface 118 at any angle, including 90°. Additionally, the exterior periphery surface 118 comprises a curvature from the exterior base surface 114 to the exterior wall surface 116. Or, the radius of curvature at the exterior periphery surface 118 is from 2 mm to 35 mm, or from 3.5 mm to 25 mm, most or from 5 mm to 15 mm. A curvature is particularly preferred if the dosing cup 100 comprises a scrubbing region 134 that is at least partially located at the exterior periphery surface 118.

The dosing cup 100 can be configured to attach with a detergent composition container. For example, the dosing cup may connect with a cap of a container. In other exemplary configurations, the dosing cup may itself be configured as a cap for a detergent composition container. The dosing cup may connect with the container in various ways, including clips, a screw thread, or a push-fit mechanism. In one embodiment, the interior base surface of the dosing cup comprises the first part of an attachment system, and an exterior top surface of a cap comprises a second part of an attachment system, wherein said attachment system comprises a cooperating attachment protrusion and attachment channel. Alternatively, the dosing cup may also engage with a bottle to form a seal to close the container, hence forming a cap for the container.

Dosing Window

As discussed above, the first portion 138 of the dosing cup 100 includes a dosing window 126. As shown in FIG. 3A, the dosing window 126, shown in the form of a projection 144, is defined by a length L that starts from the axial position where the adjoining portion of the sidewall 111, shown as the second portion 140 in FIG. 3A for exemplary purposes, terminates nearest to the rim 112 and extends in an axial direction A to the point in the projection 144 that is nearest to the base 108. The dosing window is also defined by a width W that is perpendicular to the length L. The dosing window 126 is defined by a first portion 152, a second portion 154, and a third portion 156 positioned between the first and second portions 152 and 154.

The width W of the dosing window 126 may be less than the length L of the dosing window 126. The width W of the dosing window 126 may be less than about 50% of the length L of the dosing window 126, or less than about 40% of the length L of the dosing window 126, or less than about 30% of the length L of the dosing window 126. It is to be appreciated that a relatively narrow dosing window 126 may help to quickly draw a user's attention to the dosing window 126 and the dosing indicium 128, assisting the user in making a quick and accurate measurement of detergent composition.

The dosing window 126 may be configured in various different shapes. For example, the dosing window 126 may have a substantially round shape such as shown in FIG. 3A, or may have a substantially rectangular, triangular, diamond, oblong, or various other shapes. The periphery of the dosing window 126 may be straight, curved, curvilinear, or a combination thereof.

Figure 5:
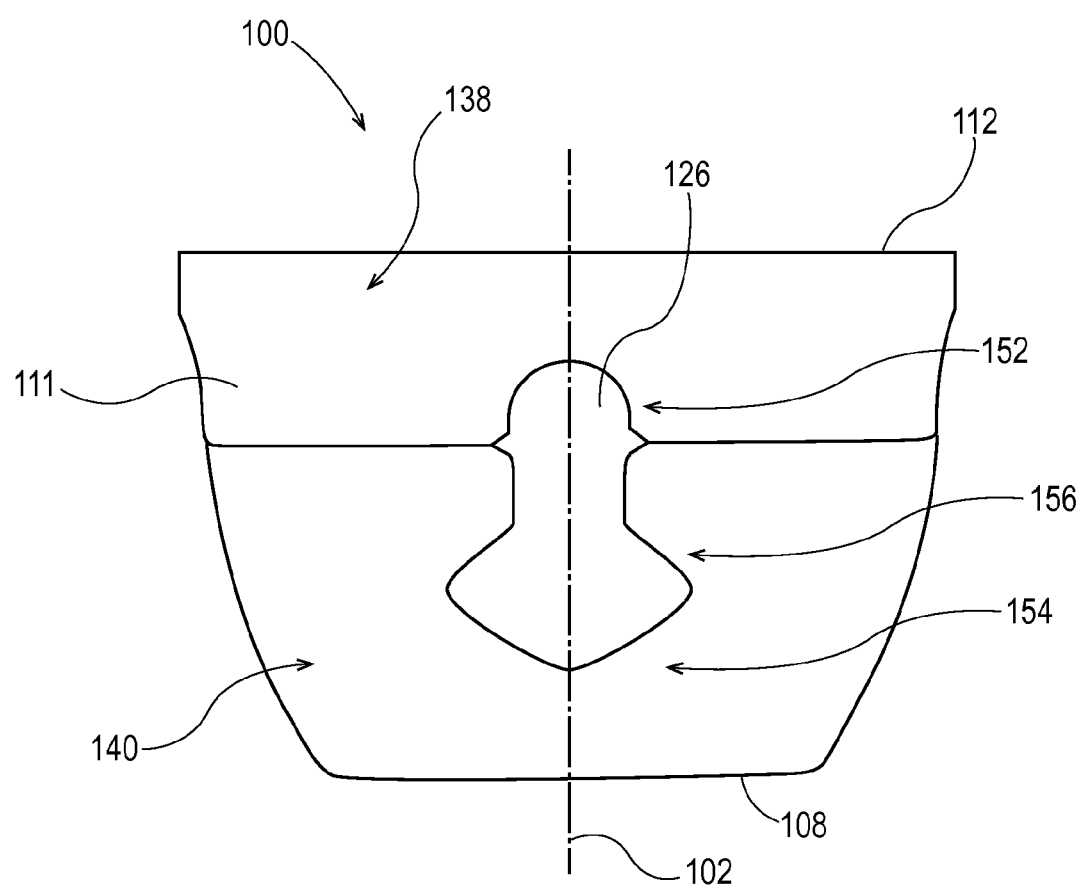
FIG. 5 is a front, elevation view of a dosing cup having an exemplary dosing window.

The dosing window 126 may have a constant width across the entire length L of the dosing window 126, or the dosing window 126 may have different widths at various positions along the length L of the dosing window 126. However, it is to be appreciated that the width W of the dosing window 126 is taken as the maximum width of the dosing window 126 along the length L. For example, the dosing window 126 may have a relatively constant with along the majority of the length L of the dosing window 126, but may narrow near the ends of the first and second portions 152 and 154 of the dosing window 126. In some exemplary configurations, such as shown in FIG. 5, the width of the dosing window 126 may be the narrowest in the first and second portions 152 and 154 and widest in the third portion 156.

As shown in FIG. 3A, the first portion 152 of the dosing window 126 may extend axially beyond the point of the second portion 140 of the sidewall 111 nearest to the rim 112. The dosing window 126 may be raised relative to the majority of the exterior wall surface 116 in the first portion 138 and/or second portion 140 of the sidewall 111.

Indicium

As shown in FIGS. 1-3B, the dosing cup 100 can be provided with one or more indicia, shown in the form of dosing indicium 128 and instructional indicium 164. Indicium may be used to communicate a message to a user, such as dosing, usage instructions, or branding information. The indicium may be disposed in various locations on the dosing cup 100. For example, indicium may be disposed on a surface selected from the group consisting of: the interior wall surface 122, the exterior wall surface 116, interior base surface 120, exterior base surface 114, and combinations thereof. The interior wall surface 122 may be provided with one or more interior indicia. The exterior wall surface 116 may be provided with one or more exterior indicia. When at least part of the sidewall 111 is transparent, interior indicium may be visible from the interior 104 and exterior 106 of the dosing cup 100. Likewise, exterior indicium may be visible from the interior 104 and exterior 106 of the dosing cup 100. The first portion 138 and the second portion 140 of the sidewall 111 of the dosing cup 100 may comprise one or more indicia.

To facilitate quick and accurate measuring, the dosing cup 100 may be provided with one or more dosing indicium 128. The dosing indicium 128 can indicate the recommended dosage of detergent composition to be poured into the dosing cup 100. The dosing indicia 128 may indicate the recommended dosages for a usage selected from the group consisting of: stain pretreating, average duty wash conditions, light duty wash conditions, heavy duty wash conditions, and combinations thereof. Light duty wash conditions, typically consist of lightly soiled loads and low water hardness (from 50 mg/l to 125 mg/l of $CaCO_3$). Average duty wash conditions typically consist of moderately soiled loads and average water hardness (from 126 mg/ to 250 mg/l of $CaCO_3$). Heavy duty wash conditions typically consist of heavily soiled loads and high water hardness (greater than 250 mg/l of $CaCO_3$).

The dosing indicium 128 may be disposed on the interior wall surface 122, exterior wall surface 116, and combinations thereof. The first portion 138 and/or the second portion 140 of the sidewall 111 may include dosing indicium 128. In some exemplary configurations, the dosing window 126 may comprise dosing indicium 128.

The dosing indicia 128 can take the form of an etch, a depression, a raised portion, printing, or any other structure that is observable by a user. For example, as shown in FIG. 3B, the dosing indicium 128 may include a raised portion 162. The dosing indicium may also comprise a notch 160 or a nub 158 as shown in FIG. 3A. With reference to FIGS. 1-3B, the notch 160 or nub 158 may extend from, or into, the projection 144 of the first portion 138 and/or the recess 146 of the second portion 140 such that the notch 160 or nub 158 forms a part of the dosing window 126. For example, as shown in FIG. 3A, the projection 144 that forms the dosing window 126 may include one or more nubs 158 and the recess 146 of the second portion 140 may include one or more notches 160 that mate with the nubs 158 of the projection 144. The notches 160 and nubs 158 may be visible from the interior 104 and exterior 106 of the dosing cup 100.

As shown in FIG. 3A, the dosing window 126 may include a set of two circumferentially spaced nubs 158 disposed at the same axial position to indicate a recommended dosage level. In some exemplary configurations, the dosing window 126 may include first dosing indicia 128a in the form of circumferentially spaced nubs 158 and also include a second dosing indicium 128b. The second dosing indicium 128b may take the form of a depression, raised portion, printing, or combinations thereof. The first and second dosing indicia 128a and 128b may be axially aligned to quickly draw the user's attention to the particular dosing recommendation. As shown in FIG. 3B, the second dosing indicium 128b may take the form of a raised portion 162. The combination of notches, nubs, and raised, recessed, or printed dosing indicium may assist the user in making a quick and accurate measurement.

As shown in FIG. 3A, the length of the second dosing indicium 128b may be at least 50% of the width W of the dosing window 126.

As shown in FIG. 2, the interior wall surface 122 may comprise one or more dosing indicia 128. The dosing indicia 128 of the interior wall surface 122 may be axially aligned with the one or more dosing indicia 128 of the dosing window 126. In such a configuration, the dosing indicium 128 on the interior wall surface 122 of the dosing cup 100 may allow to quickly and accurately make a measurement when viewing the interior 104 of the dosing cup 100.

As shown in FIG. 3A, the first portion 138 may adjoin the second portion 140 along an axial position that corresponds with a predetermined detergent dose. For example, the first and second portions 140 may adjoin each other at an axial position that corresponds with a heavy duty detergent dose, for example. Having the first and second portions 138 and 140 adjoin at an axial position that corresponds with a predetermined detergent dose allows a user to quickly and accurately measure the predetermined detergent dose. Moreover, as shown in FIG. 3A, a dosing indicium 128 may be positioned at the same axial position where the first and second portions 138 and 140 adjoin.

Figure 6A:
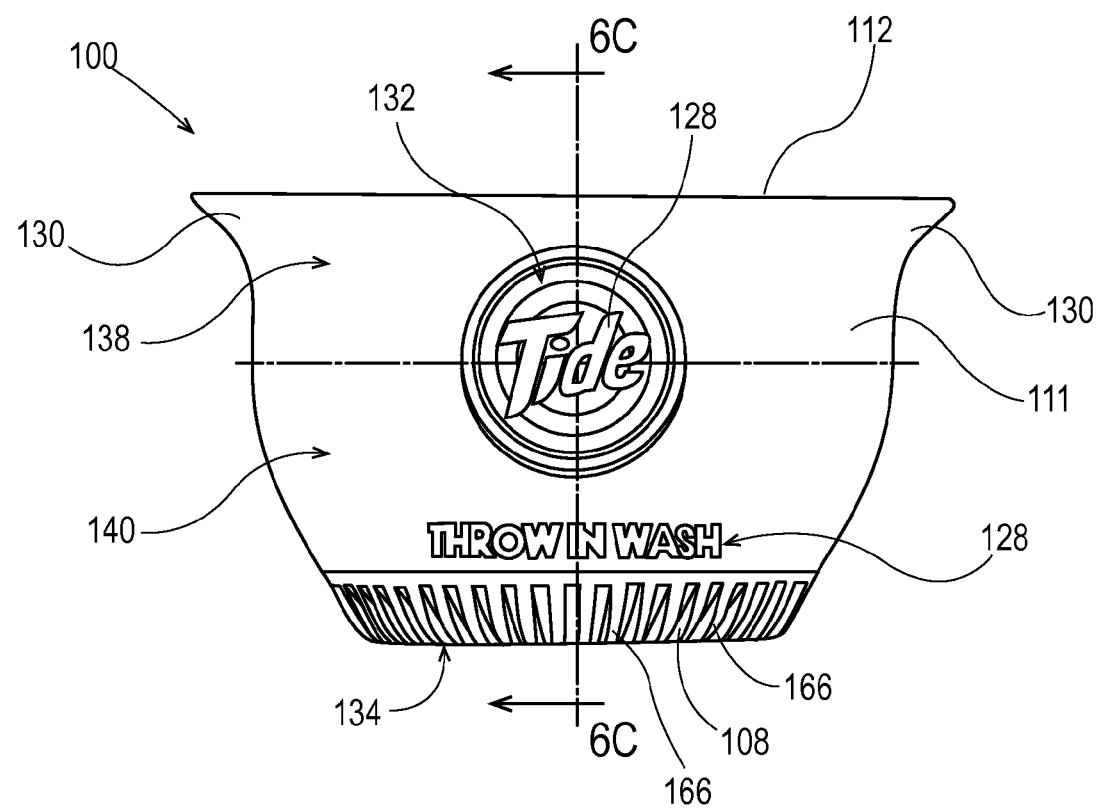
FIG. 6A is a side, elevation view of a first side of a dosing cup having a gripping region and two spouts.

The dosing cup 100 may comprise instructional indicia. For example, as shown in FIG. 6A, to provide dosing instructions to a user, the exterior wall surface 116 may comprise instructional indicium 164. The exemplary instructional indicium 164 shown in FIG. 6A includes the instructions "THROW IN WASH" to inform a user that the dosing cup 100 can be thrown in an automatic washing cycle in order to clean the dosing cup 100 in preparation for the subsequent use.

The indicia may be configured as branding indicia to inform the user of the brand of detergent to use with the dosing cup.

Gripping Region

Figure 6B:
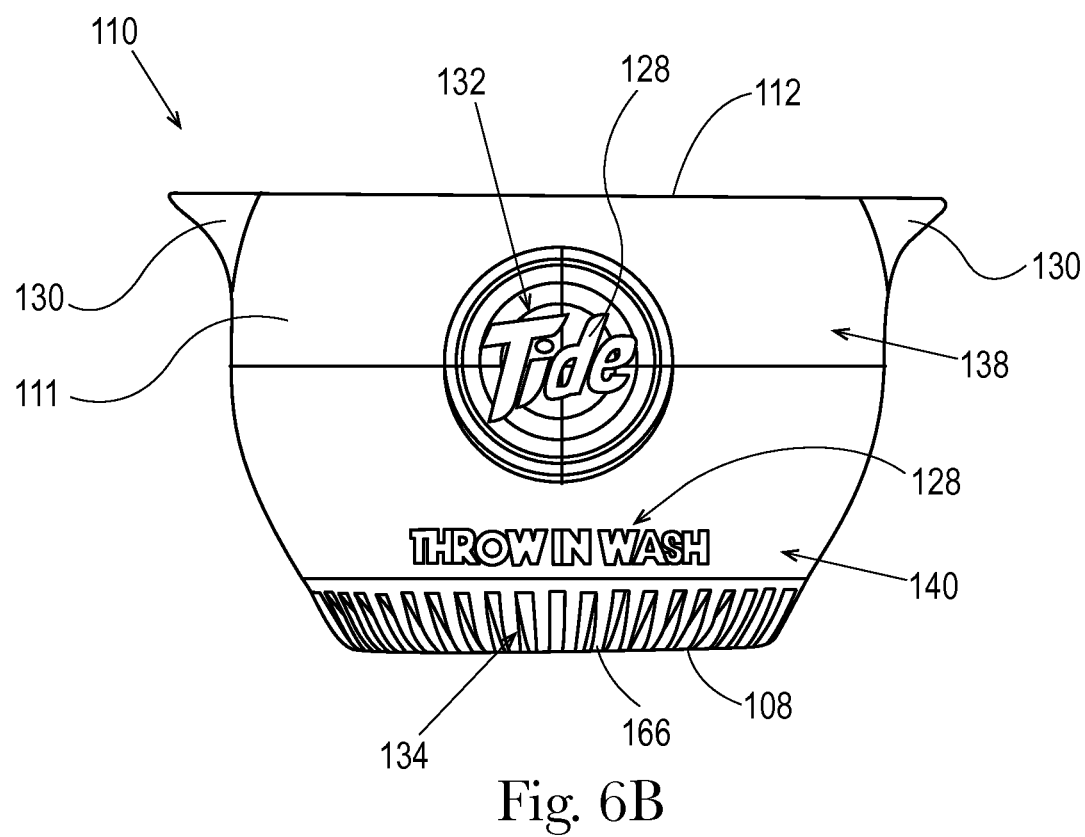
FIG. 6B is a side, elevation view of a second side of a dosing cup having a gripping region and two spouts.
Figure 6C:
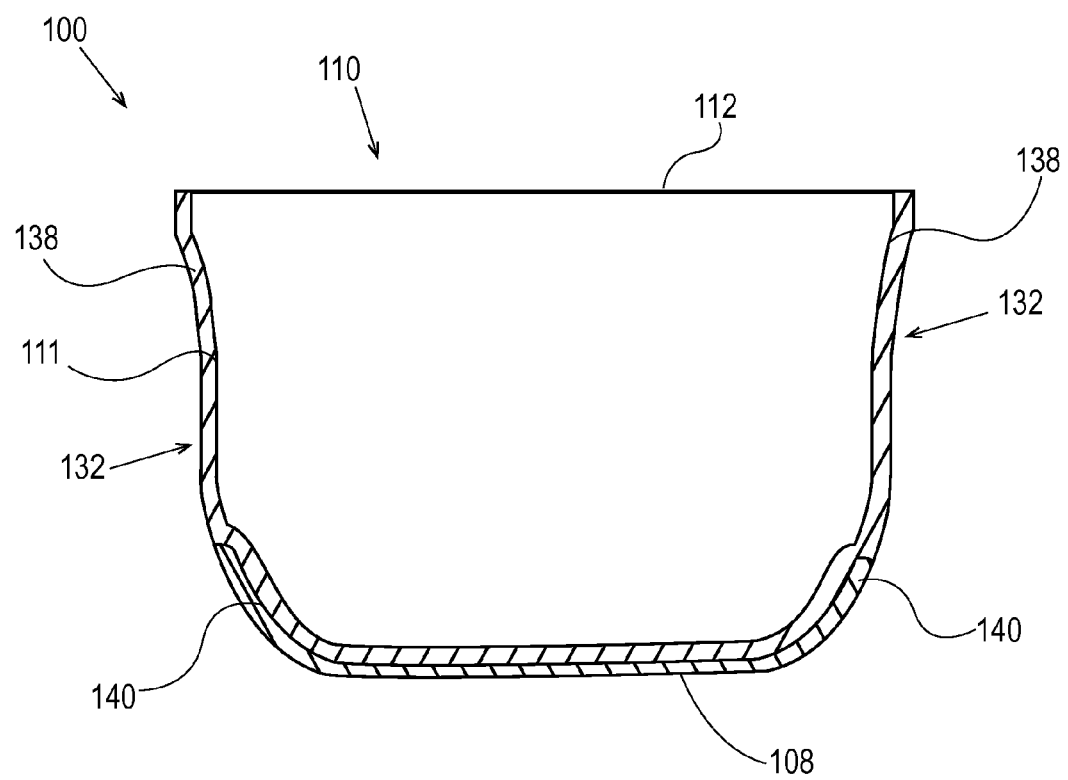
FIG. 6C is a sectional view of the dosing cup of FIG. 6A taken along lines 6C-6C.

As shown in FIGS. 6A-6C, the exterior wall surface 116 of the dosing cup 100 may also comprise a gripping region 132. The gripping region 132 may be selected from: an indented region, such as shown in FIGS. 6A-6C for exemplary purposes only; a raised region; a textured region; or a combination thereof. The gripping region 132 or regions may improve the ergonomics of the dosing cup 100 for holding, pouring, spreading, scrubbing, and/or any combination thereof. The gripping region 132 may be differentiated from other regions of the dosing cup 100 to help guide the user to hold the dosing cup 100 in a manner that makes holding, measuring, pouring, spreading, and/or scrubbing easier. For example, the gripping region 132 can vary from surrounding regions in color, texture, translucency, and combinations thereof. The gripping region 132 may include one or more indicia. The indicia on the gripping region 132 may include instructional indicia or branding indicia, for example.

With continued reference to FIGS. 6A-6C, the first portion 138 of the sidewall 111 of the dosing cup 100 may comprise one or more gripping regions 132. The gripping region 132 may be configured as a second projection extending from the first portion 138 of the sidewall 111. However, in other exemplary configurations, the second portion 140 of the sidewall 111 may comprise one or more gripping regions. In a dosing cup configuration comprising two gripping regions 132 and a scrubbing region 134, at least a portion of the scrubbing region 134 may be positioned between the two gripping regions 132 to improve the ergonomics of the dosing cup 100 for the purpose of pre-treating soiled items.

In a configuration wherein the first portion 138 of the sidewall comprises the gripping region 132 or regions, such as shown in FIG. 1, the midpoint of the gripping region 132 may align axially with one or more of the dosing indicia 128 of the dosing window 126 and at least a portion of the second portion 140 of the sidewall 111 may terminate at the midpoint of the gripping region 132. As such, the gripping region 132 may also be used for measuring a quantity of detergent composition. For example, as shown in FIG. 1, the midpoint of the gripping region 132 aligns axially with the dosing indicium 128 closest to the rim 112 of the dosing cup 100. Thus, it is to be appreciated that the gripping region 132 may be used to measure a dosage for a heavily soiled or large load of items.

Spout

Figure 7:
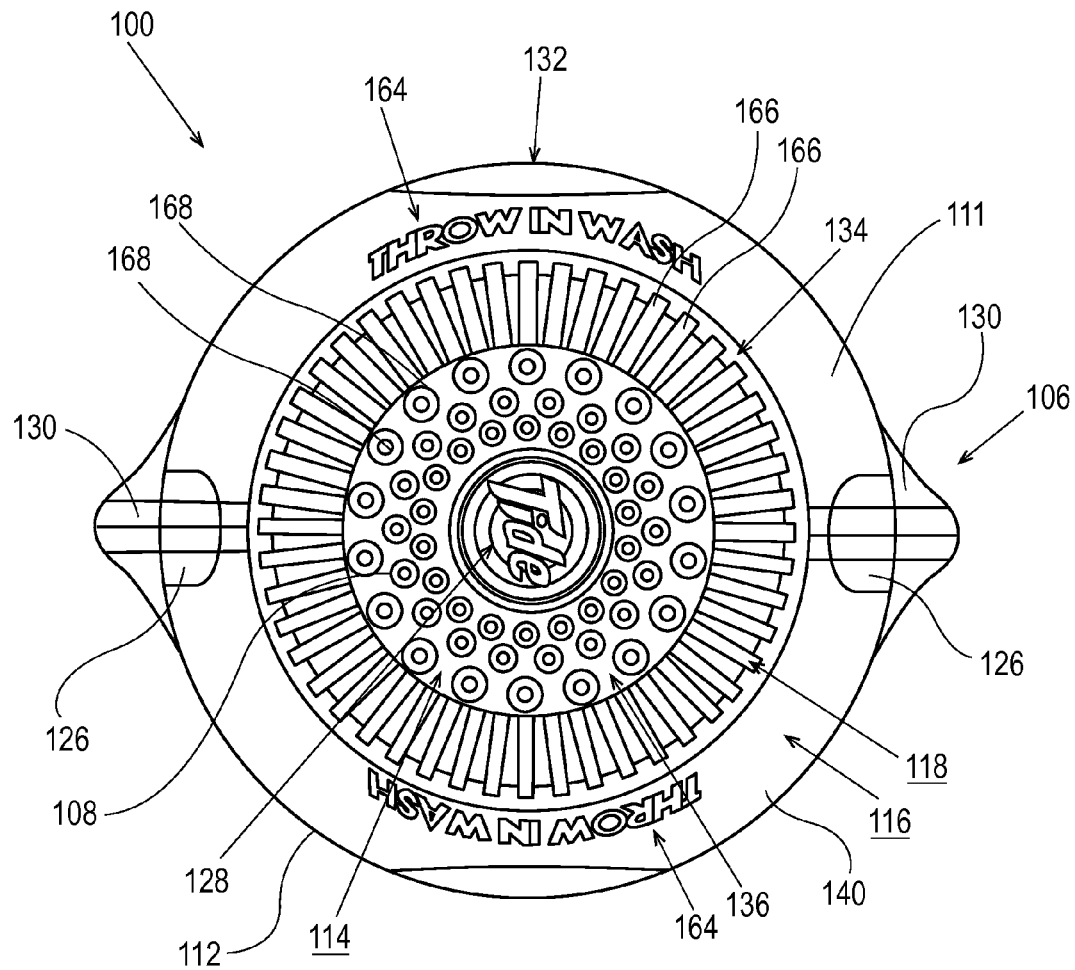
FIG. 7 is a bottom, plan view of a dosing cup having two spouts.
Figure 8:
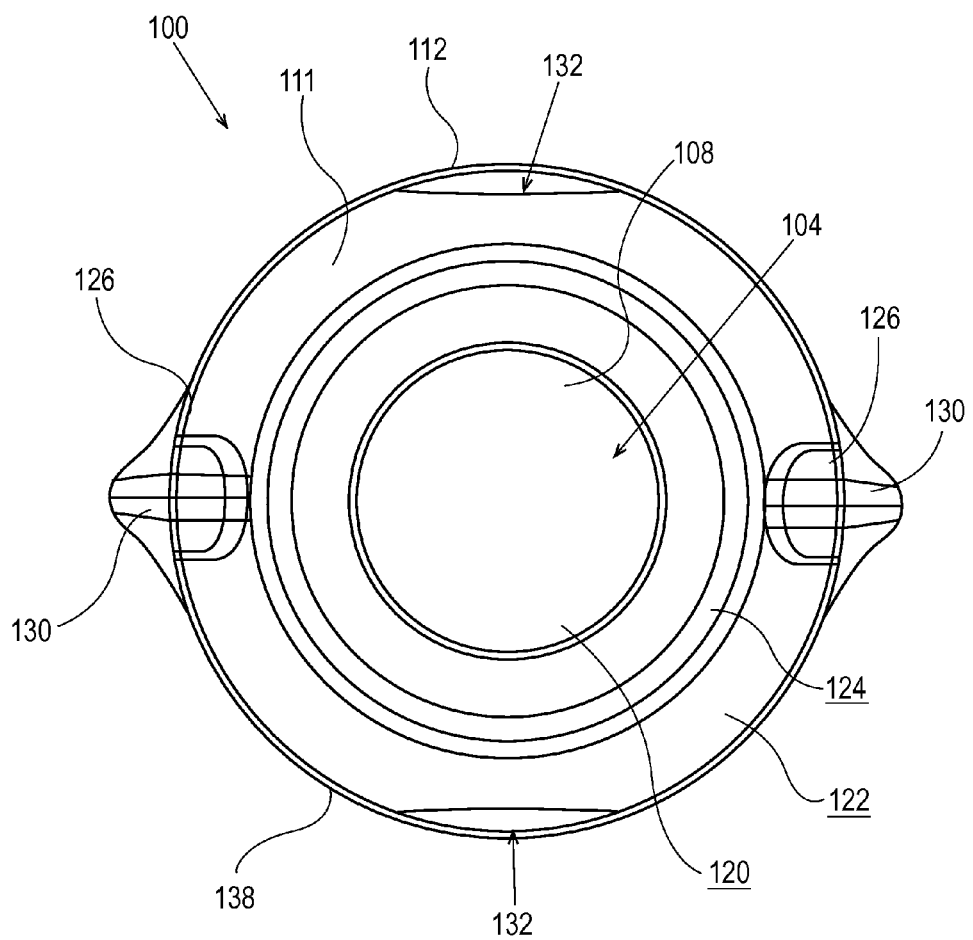
FIG. 8 is a top, plan view of a dosing cup having a scrubbing region and a spreading region.

As shown in FIGS. 1, 7, and 8, the dosing cup 100 may also comprise one or more spouts 130 to control the flow of detergent composition as it is poured from the dosing cup 100. The spout 130 may protrude from the rim 112 and sidewall 111. The spout 130 may be circumferentially spaced from the gripping region 132 by about 90 degrees. The spout 130 may be circumferentially aligned with the dosing window 126.

In some exemplary configurations, the dosing cup may include a baffle adjacent to the spout. Such baffles split the opening into two or more sections comprising a fill opening and a spout opening. The baffle helps the user to dose the required amount of detergent composition, without spilling excess detergent composition.

Scrubbing Region

As shown in FIGS. 1 and 7, the dosing cup comprises a scrubbing region 134. The scrubbing region 134 comprises at least two scrubbing protrusions 166. The scrubbing region 134 may comprise from 2 to 50, or 5 to 30, or 10 to 20 scrubbing protrusions 166. The scrubbing region 134 may be at least partially located on the exterior periphery surface 118. Positioning the scrubbing 134 region at the exterior periphery surface 118 may allow the user to apply greater pressure while scrubbing and may also be more ergonomic for scrubbing. The scrubbing region 134 may extend along the entire exterior periphery surface 118 as shown in FIG. 7, or may extend along only a portion of the exterior periphery surface 118. An exemplary scrubbing region is described in European Patent Application No. EP13163326.5, filed Apr. 11, 2013, entitled "PRETREATMENT CUP FOR TREATING DURABLE AND DELICATE FABRICS".

While the scrubbing protrusions 166 can have any orientation, the scrubbing protrusions 166 may have a substantially parallel orientation. Such scrubbing protrusions 166 typically have a distance between the scrubbing protrusions 166 which varies by less than 100%, or less than 50%, or less than 25%, or less than 15% over the length of the scrubbing protrusions 166, as measured on the surface of the scrubbing region 134.

The scrubbing protrusions 166 may be flexible, such that they are able to bend when a force is applied in a direction perpendicular to the axial length of the scrubbing protrusions 166. The scrubbing protrusions 166 may have a Shore Hardness A of from 1 to 100, or 25 to 75, or 30 to 50, as measured using DIN53505. The scrubbing protrusions 166 can be made from a material selected from the group consisting of: elastomers, rubbers, and combinations thereof. The scrubbing protrusions may be made from elastomers. While both thermoset elastomers and thermoplastic elastomers can be used, thermoplastic elastomers are preferred since they are easier to form into scrubbing protrusions.

Spreading Region

As shown in FIG. 7, the dosing cup 100 may comprise a spreading region 136 for spreading detergent composition. The spreading region 136 may be located on a surface selected from the group consisting of: the exterior base surface 114, the exterior wall surface 116, and combinations thereof. For ease of handling, the spreading region, if present, may be at least partially located on the exterior base surface 114. The spreading region may be any suitable shape, though circular and oval shapes are preferred.

While the spreading region 136 may be flat, with the exception of the spreading protrusions 168, a small curvature is preferred for spreading the detergent composition over the stained part of the fabric. In addition, a small curvature helps to smooth out fabric and remove folds during pretreating. However, it is preferable that the curvature is not so great that the spreading wipes the liquid detergent composition thinly or unevenly over the stained region of the surface. The spreading region 136 may have a curvature such that when the dosing cup is positioned with the center of mass of the spreading region 136 on a flat non-deformable surface (such as a table), the dosing cup 100 can be tilted a maximum of 45°, or a maximum of 30°, or a maximum of 15° before the spreading region 136 is no longer in contact with the non-deformable surface. The spreading region 136 may have no sharp changes in curvature (such as a step). The center of mass of the spreading region is calculated using the formula ($\rho$ is the density in Kg/m$^3$, and V is the material volume in m$^3$):

$$R = \int \rho(r) r dV / \int \rho(r) dV \qquad (1)$$

The spreading region 136 comprises 1 or more spreading protrusions 168. The spreading region may comprise at least 25, or at least 50, or at least 75 spreading protrusions. The spreading region can comprise any number of spreading protrusions, such as less than 200, or less than 150, or less than 120. The spreading protrusions 168 may be selected from the group consisting: of lines, dots, and combinations thereof. If lines are present, they can be straight or curved. The spreading protrusions 168 can be from 2 mm to 40 mm, or from 3 mm to 25 mm, or from 4 mm to 5 mm in length. The width of the lines can be from 0.2 mm to 4 mm, or from 0.5 mm to 3 mm, more or from 0.8 mm to 2 mm in width. The lengths are measured along the axial length of the line. If dots are present, they can be any shape, but may be circular or oval in shape. The dots can have a width of from 0.2 mm to 5 mm, from 0.5 mm to 4 mm, or from 1 mm to 3 mm. Such spreading protrusions 168 do not result in the detergent composition being restricted under the spreading region 136, when the dosing cup 100 is used for spreading the liquid detergent over a stain. Suitable lines are exemplified in FIGS. 6, 8, 9, and 10. Suitable dots are exemplified in FIGS. 7, 9, and 10.

The spreading protrusions 168 can be arranged in a pattern selected from the group consisting of: radial, concentric, spiral, or combinations thereof. While the central point of the pattern may be located at the center of mass of the spreading region 136, the central point of the pattern can be located at any suitable point on the spreading region 136. The resultant distribution of spreading protrusions helps to distribute the liquid detergent uniformly over the stain.

For ease of manufacture, the spreading region 136, including the spreading protrusions 168, can be made from one material. The material may comprise polypropylene. However, in other exemplary configurations, the spreading protrusions 168 can be made from a different material from the rest of the spreading region 136.

If the spreading protrusions 168 are too flexible, flicking of the detergent composition may occur during use. Therefore, the spreading protrusions 168 may be made from a material having a hardness, as measured on the Rockwell scale (ISO 2039-2), of from 50 to 150. The spreading protrusions 168 are made from a material having a hardness from 60 to 100, or from 65 to 85, as measured on the Rockwell scale (ISO 2039-2). For a similar reason, the spreading protrusions 168 may have a height from the exterior base surface of from 0.2 mm to 4 mm, or from 0.5 mm to 1.5 mm. In addition, such patterns smooth out and deform the fibrous structure of the surface being treated, and help spread the detergent composition uniformly over the soiled surface.

To avoid the scrubbing region 134 affecting spreading of the detergent composition by the spreading region 136, the spreading region 136, if present, may be located at least partially on a different plane to the scrubbing region 134. The scrubbing region 136 may be located at least partially on the exterior wall surface 116, the exterior periphery surface 118, and combinations thereof, while the spreading region 136 is located at least partially on the exterior base surface 114. In another embodiment, both the spreading region 136 and the scrubbing region 134 are located on the exterior base surface 114, with the exterior base surface 114 curved such that the scrubbing region 134 is located on a different plane to the spreading region 136. In yet another exemplary configuration, the exterior base surface 114 is divided into two connected surfaces which are angled relative to each other, with the scrubbing region 134 located onto one surface, and the spreading region 136 located onto the other surface, such that the two regions are located on different planes.

To simplify use, and for easy of manufacture, the spreading region 136 and scrubbing region 134 may be connected together. In some exemplary configurations, the spreading region 136 and scrubbing region 134 may contact each other at the exterior periphery surface 118.

Method of Laundering Fabrics

With reference to FIGS. 1-3A, the dosing cup 100 of the present disclosure is suitable for dosing detergent. The method may include holding the dosing cup 100 in one hand and pouring a detergent into the dosing cup 100. The method may include resting the dosing cup 100 on a rigid surface and pouring a detergent into the dosing cup. The detergent may be poured from a bottle held in a user's hand or may be poured from a spout of a bottle that is resting on rigid surface. The method may include measuring a dose of detergent. The user may measure a desired dose of detergent by viewing the dosing window 126 and/or dosing indicium 128 from the interior 104 or exterior 106 of the dosing cup 100. Once a desired dose is measured into the dosing cup 100, the detergent may be dosed into the automatic washing machine.

The dosing cup 100 of the present disclosure may also be used for pretreating a variety of stains, and is particularly useful for improving the removal of greasy stains, grassy stains, particulate stains, and combinations thereof. Greasy stains comprise oils and fats. Grassy stains are those derived from contact with grass. Particulate stains comprise discrete particulate material. Particulate material, comprised in such stains, can include carbon residues from burnt food stuffs, and powders from such sources as make-up and soils.

A method of washing soiled items, such as fabrics and dishes, according to the present disclosure, comprises the steps of:
  a. measuring a dose of a detergent composition in a dosing cup 100; and/or
  b. dosing the detergent composition into an automatic washing machine;
  c. washing the soiled item in an automatic washing machine.

A method of washing soiled items, such as fabrics and dishes, according to the present disclosure, comprises the steps of:
  d. measuring a dose of a detergent composition in a dosing cup 100; and/or
  e. applying the detergent composition onto the soiled item to form a treated portion of the soiled surface; and/or
  f. scrubbing the treated portion of the soiled item with the scrubbing region 134 of the dosing cup 100; and
  g. washing the soiled surface in an automatic washing machine.

The detergent composition may be a liquid or gel detergent composition. The soiled item may include fabrics in the form of clothing, towels, and sheets, for example. The soiled item may include a dish or dishware, pots, or pans, for example. The automatic washing machine may be an automatic laundry-washing machine or an automatic dish-washing machine.

Methods:

Translucency Measurements:

The translucency of a material is measured using the following procedure, using an X-Rite SP-64 Spectrophotometer:
  1) Cut out a piece of a relatively flat portion of the bottle. The piece must be able to fit into the base calibration portion (also known as the 'shoe' of the X-Rite SP-64 Spectrophotometer. Clean the sample with a lint free cloth, taking care not to scratch the surfaces.
  2) Calibrate the X-Rite SP-64 Spectrophotometer, using the "White reference" and "Black reference", following the procedure in the manual.
  3) Select the "Opacity" option from the menu of the X-Rite SP-64 Spectrophotometer, and measure the opacity of the sample, using the "8 mm" aperture size: following the relevant procedure in the instruction manual, take a reading over the Black spot on the shoe, and then a reading over the White spot on the shoe. Repeat the measurement twice, and average the three readings to give the "% opacity".
  4) The % translucency is calculated as: 100−% opacity.

5) Each sample piece is measured in the instrument repeatedly, resulting in four measurements. Between each of the four measurements per sample, the sample piece is rotated in the holder by 90 degrees in a clockwise direction. The resulting four measured values per sample are averaged to yield the recorded value for that sample piece.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A dosing cup having a longitudinal axis and defining an interior and an exterior, the dosing cup comprising:
   a base;
   an opening opposing the base, wherein the opening is circumscribed by a rim;
   a sidewall extending from the base to the rim, wherein the sidewall comprises:
      a first portion extending from the rim toward the base, wherein the first portion comprises a projection, the projection is defined by a length that extends axially along the sidewall and a width that is perpendicular to the length, wherein the width of the projection is less than the length of the projection, wherein the projection comprises a dosing indicium; and
      a second portion extending from the base toward the rim, wherein the second portion comprises a recess, wherein the projection of the first portion at least partially mates with the recess of the second portion, and
      wherein the first portion has a first translucency and the second portion has a second translucency, wherein the first translucency is different than the second translucency.

2. The dosing cup of claim 1, wherein the first portion is transparent and the second portion is opaque.

3. The dosing cup of claim 1, wherein the dosing indicium is selected from the group consisting of a raised portion, an etch, a depression, printing, or a combination thereof, and wherein the dosing indicium is defined by a length, wherein the length of the dosing indicium is at least 50% of the width of the projection.

4. The dosing cup of claim 1, wherein the dosing indicium comprises a notch or a nub.

5. The dosing cup of claim 1, wherein the projection comprises a first dosing indicium and a second dosing indicium, wherein the first dosing indicium is axially aligned with the second dosing indicium, wherein the first dosing indicium is a notch or a nub and the second dosing indicium is selected from the group consisting of a raised portion, an etch, a depression, printing, or a combination thereof.

6. The dosing cup of claim 1, wherein the projection comprises a pair of circumferentially spaced dosing indicia, wherein the dosing indicia are selected from the group consisting of a notch, a nub, or combinations thereof.

7. The dosing cup of claim 1, wherein the sidewall defines an interior wall surface and an exterior wall surface, wherein the interior wall surface comprises a dosing indicium, wherein the dosing indicium of the projection is axially aligned with the dosing indicium of the interior wall surface.

8. The dosing cup of claim 1, wherein the first portion adjacent to the projection terminates at the same axial position as the dosing indicium.

9. The dosing cup of claim 1, wherein the first portion comprises a second projection circumferentially spaced from the first projection, wherein the second projection forms a gripping region that is selected from the group consisting of: an indented region, a raised region, a textured region, or a combination thereof.

10. The dosing cup of claim 9, wherein the first portion comprises a spout, wherein the spout is circumferentially aligned with the first projection.

11. The dosing cup of claim 10, wherein the first portion is integral with the base.

12. The dosing cup of claim 9, wherein the gripping region has a midpoint, wherein the midpoint of the gripping region aligns axially with the dosing indicium.

13. The dosing cup of claim 1, wherein the first portion comprises a spout, wherein the spout is circumferentially aligned with the projection.

14. The dosing cup of claim 1 further comprising a scrubbing region having at least two scrubbing protrusions.

15. The dosing cup of claim 14, wherein the scrubbing region comprises a plurality of scrubbing protrusions spaced 360 degrees circumferentially about the base of the dosing cup.

16. A dosing cup having a longitudinal axis and comprising:
   a base;
   an opening opposing the base, wherein the opening is circumscribed by a rim;
   a sidewall extending from the base to the rim, wherein the sidewall comprises:
      a first portion extending from the rim toward the base, the first portion having a first translucency; and
      a second portion extending from the base toward the rim, the second portion having a second translucency that is different from the first translucency,
      wherein the first and second portions are contiguous, wherein the first portion comprises a first dosing indicium and the second portion comprises a second dosing indicium, wherein the first dosing indicium is circumferentially adjacent and axially aligned with the second dosing indicium, and wherein the first dosing indicium is selected from the group consisting of a raised portion, an etch, a depression, printing, or a combination thereof and the second dosing indicium is a notch or a nub.

17. The dosing cup of claim 16, wherein the first portion is transparent and the second portion is opaque.

18. The dosing cup of claim 16, wherein the first portion comprises a projection and the second portion comprises a recess, wherein at least a portion of the projection mates with the recess.

19. A dosing cup having a longitudinal axis and defining an interior and exterior, the dosing cup comprises:
- a base;
- an opening opposing the base, wherein the opening is circumscribed by a rim;
- a sidewall extending from the base to the rim, wherein the sidewall comprises:
  - a first portion extending from the rim to the base, the first portion having a first translucency, wherein the first portion comprises a projection that extends axially along the sidewall, the projection having a dosing indicium; and
  - a second portion extending from the base toward the rim, the second portion having a second translucency, wherein the second portion comprises a recess having a dosing indicium, wherein the projection of the first portion mates with the recess of the second portion and the dosing indicium of the projection is axially aligned with the dosing indicium of the recess,
  - wherein the first translucency is different than the second translucency, and
  - wherein the second portion partially overlaps the first portion, and
  - wherein the second portion does not overlap the first portion at the projection.

\* \* \* \* \*